(12) United States Patent
Meier et al.

(10) Patent No.: US 9,777,202 B2
(45) Date of Patent: Oct. 3, 2017

(54) CURABLE COMPOSITION SUITABLE FOR THE BONDING OF PLASTICIZED PVC

(71) Applicant: SIKA TECHNOLOGY AG, Baar (CH)

(72) Inventors: Heinz Meier, Zurich (CH); Markus Haufe, Zurich (CH); Josef Lussi, Zermatt (CH); Elyes Jendoubi, Zurich (CH); Wilfried Carl, Wadenswil (CH)

(73) Assignee: SIKA TECHNOLOGY AG, Baar (CH)

( * ) Notice: Subject to any disclaimer, the term of this patent is extended or adjusted under 35 U.S.C. 154(b) by 470 days.

(21) Appl. No.: 14/390,614

(22) PCT Filed: Apr. 9, 2013

(86) PCT No.: PCT/EP2013/057343
§ 371 (c)(1),
(2) Date: Oct. 3, 2014

(87) PCT Pub. No.: WO2013/153046
PCT Pub. Date: Oct. 17, 2013

(65) Prior Publication Data
US 2015/0044459 A1   Feb. 12, 2015

(30) Foreign Application Priority Data
Apr. 10, 2012  (EP) .................................... 12163562

(51) Int. Cl.
| C09J 175/16 | (2006.01) |
| C09J 175/14 | (2006.01) |
| C09J 151/08 | (2006.01) |
| B32B 37/12 | (2006.01) |
| B32B 38/00 | (2006.01) |
| C08F 285/00 | (2006.01) |
| C08F 290/06 | (2006.01) |
| C08G 18/75 | (2006.01) |
| C08G 18/67 | (2006.01) |

(52) U.S. Cl.
CPC ............ *C09J 175/14* (2013.01); *B32B 37/12* (2013.01); *B32B 38/00* (2013.01); *C08F 285/00* (2013.01); *C08F 290/067* (2013.01); *C08G 18/672* (2013.01); *C08G 18/755* (2013.01); *C09J 151/08* (2013.01); *C09J 175/16* (2013.01); *B32B 2037/1253* (2013.01); *B32B 2038/0076* (2013.01); *B32B 2327/06* (2013.01); *B32B 2375/00* (2013.01); *B32B 2379/00* (2013.01); *B32B 2419/00* (2013.01); *Y10T 428/254* (2015.01); *Y10T 428/2852* (2015.01); *Y10T 428/2883* (2015.01); *Y10T 428/2887* (2015.01); *Y10T 428/2891* (2015.01); *Y10T 428/2896* (2015.01)

(58) Field of Classification Search
None
See application file for complete search history.

(56) References Cited

U.S. PATENT DOCUMENTS

| 3,873,640 A | 3/1975 | Owston et al. |
| 2008/0029210 A1* | 2/2008 | Swei .................. B32B 27/08 156/272.2 |
| 2013/0052386 A1* | 2/2013 | Slongo ................ B32B 7/12 428/40.1 |

FOREIGN PATENT DOCUMENTS

| EP | 2 003 153 | 12/2008 |
| EP | 2 072 592 | 6/2009 |
| EP | 2 177 553 | 4/2010 |
| WO | WO-2005/040295 | 5/2005 |
| WO | WO-2007/068625 | 6/2007 |
| WO | WO-2010/043707 | 4/2010 |

OTHER PUBLICATIONS

Office Action issued on Chinese Application 201380017813.5, mailed Mar. 17, 2016, English translation provided.
Notice of Reasons for Rejection issued on Japanese Application 2015-504924, mailed Feb. 14, 2017, English translation included.
International Search Report for PCT/EP2013/057343, mailed Aug. 5, 2013.
International Preliminary Report on Patentability for PCT/EP2013/057343, issued Oct. 14, 2014.
Office Action issued on Chinese Application 201380017813.5, mailed Nov. 9, 2016.
Office Action issued on Chinese Application 201380017813.5, mailed May 3, 2017.

* cited by examiner

*Primary Examiner* — Sheeba Ahmed
(74) *Attorney, Agent, or Firm* — Foley & Lardner LLP

(57) ABSTRACT

A composition includes methyl methacrylate MMA, at least one elastomer or a core-shell polymer, and at least one radical former, as an adhesive, sealant or coating for gluing, sealing or coaling substrates containing plasticized PVC.

28 Claims, No Drawings

CURABLE COMPOSITION SUITABLE FOR THE BONDING OF PLASTICIZED PVC

CROSS-REFERENCE TO RELATED APPLICATIONS

This application is a U.S. national phase application claiming the benefit of International Application Serial No. PCT/EP2013/057343, filed on Apr. 9, 2013, which in turn claims the benefit of EP 12163562.7, filed on Apr. 10, 2012, the entire disclosures of which are hereby incorporated by reference for all purposes in their entirety as if fully set forth herein.

TECHNICAL FIELD OF THE INVENTION

This invention relates to the field of elastic adhesives, sealants and coatings on the basis of free radically polymerizable monomers suitable for the bonding of plasticized PVC.

BACKGROUND OF THE INVENTION

Compositions on the basis of free radically polymerizable monomers, in particular (meth)acrylate compositions, have long been used in adhesives, sealing and coating technology. Also known is the use of (meth)acrylate functionalized elastomers to increase the flexibility of adhesives and sealants as well as coatings of this type.

For example, compositions of this type are described in WO 2010/043707. However, the compositions described in this prior art document have the disadvantage that during the bonding, sealing or coating of PVC containing plasticizers, they exhibit low adhesion if the plasticized PVC is damp or if the bonded plasticized PVC is immersed in water. Compositions of this type are unsuited in particular for the bonding of sealing membranes made of plasticized PVC.

SUMMARY OF THE INVENTION

The object of the present invention is therefore to make available elastic compositions on the basis of free radically polymerizable monomers that have good adhesion to wet plasticized PVC or in the event bonded plasticized PVC is immersed in water.

Surprisingly, it has been found that this object is accomplished by compositions of the type described herein. In one aspect, an article is provided including an adhesive, sealant, or coating composition and a first substrate, wherein: the composition includes: 20% to 90% by weight methyl methacrylate, in relation to the total weight of the composition; either 1% to 40% by weight of at least one elastomer, in relation to the total weight of the composition; 1% to 20% by weight, of at least one core-shell polymer, in relation to the total weight of the composition; or 1% to 40% by weight of at least one elastomer, in relation to the total weight of the composition and 1% to 20% by weight, of at least one core-shell polymer, in relation to the total weight of the composition; and at least one radical former; and the first substrate comprises a plasticized polyvinylchloride having from 20% to 40% by weight of a plasticizer, in relation to a total weight of the plasticized PVC.

Additional aspects of the invention are the object of additional independent claims. Particularly preferred embodiments of the invention are the object of the dependent claims.

DETAILED DESCRIPTION

The object of the present invention is the use of a composition comprising:
a) 20-90% by weight of methyl methacrylate MMA, in particular 50-80% by weight, preferably 55-70% by weight, in relation to the total weight of the composition, and
b1) 1-40% by weight, in particular 7.5-35% by weight, preferably 10-20% by weight, in relation to the total weight of the composition, of at least one elastomer, and/or
b2) 1-20% by weight, in particular 2-10% by weight, preferably 2-5% by weight, in relation to the total weight of the composition, of at least one core-shell polymer, and
c) at least one radical former, in particular a peroxide, a hydroperoxide or a perester, most preferably dibenzoyl peroxide,
as adhesive, sealant or as coating, in particular as adhesive, for the bonding or sealing or coating, in particular the bonding, of substrates containing plasticized PVC, wherein the percentage of plasticizer is 20% by weight—40% by weight, in particular 25% by weight—35% by weight, in relation to the total weight of the plasticized PVC.

Substance names beginning with "poly", such as, for example, polyisocyanate, polyurethane, polyester or polyol, as used in the present document mean substances that formally contain two or more per molecule of the functional groups occurring in their name.

The term "polymer" as used in the present document means, on one hand, a group of chemically uniform macromolecules that differ, however, with reference to degree of polymerization, molar weight and chain length, that were produced by a poly-reaction (polymerization, polyaddition, polycondensation). On the other hand, the term also includes derivatives of such a group of macromolecules from poly-reactions, i.e. compounds that were obtained by reactions, for example additions of substitutions, of functional groups on the above mentioned macromolecules, and that can be chemically uniform or non-uniform. The term also includes prepolymers [Prepolymere], i.e. reactive oligomeric pre-polymers [Voraddukte][1], the functional groups of which participate in the construction of macromolecules.

[1]Translators Note: The German sentence is "Der Begriff umfasst im Weiteren auch so genannte Propolymere, das heisst reaktive oligomere Voraddukte . . . ". The two terms "Prepolymere" and "Voraddukte" are both conventionally translated "pre-polymers", i.e. some repetition in the translated sentence is unavoidable.

The term "polyurethane polymer" comprises all polymers that are produced by the so-called diisocyanate polyaddition method. This category also includes those polymers that are practically or entirely free of urethane groups. Examples of polyurethane polymers are polyether polyurethane, polyester polyurethane, polyether polyureas, polyureas, polyester polyureas, polyisocyanurates and polycarbodiimides.

"Molecular weight", as the term is used in the present document, always means the numerical average of the molecular weight $M_n$.

The plasticizers used in PVC are typically esters of organic carboxylic acids such as phthalates, for example dioctyl phthalate, diisononyl phthalate or diisodecyl phthalate, adipates, for example dioctyl adipate, azelate and sebacate, polyols, for example polyoxyalkylene polyols or polyester polyols, organic phosphorus and sulfonic acid esters or other plasticizing additives that are familiar to a person skilled in the art, for example as described in "Plasticisers, Alan S. Wilson, The Institute of Materials, 1995." Preferably they are esters of organic carboxylic acids, in particular phthalates.

The composition comprises 20-90% by weight of methyl methacrylate MMA, in particular 50-80% by weight, preferably 55-70% by weight, most preferably 55-65% by weight in relation to the total weight of the composition. Surprisingly, the use of other free radically polymerizable monomers such as, for example, methylacrylate, tetrahydrofurfuryl(meth)acrylate, benzyl(meth)acrylate, isobornyl (meth)acrylate and trimethylcyclohexyl(meth)acrylate, in contrast to methyl methacrylate, does not result in adhesion to plasticized PVC, in particular with damp or wet substrates made of plasticized PVC.

The composition also has:
b1) 1-40% by weight, in particular 7.5-35% by weight, preferably 10-20% by weight, in relation to the total weight of the composition, of at least one elastomer and/or
b2) 1-20% by weight, in particular 2-10% by weight, preferably 2-5% by weight, in relation to the total weight of the composition, of at least one core-shell polymer.

The term "elastomer" as used in the present document means compounds like those listed as elastomers in "CD Rompp Chemie Lexikon," 9th Edition, Version 1.0, Georg Thieme Verlag, Stuttgart 1995.

Preferably they are elastomers that have free radically polymerizable groups, in particular terminal groups.

Preferably the elastomers are polymers, in particular polyurethane polymers, or block copolymers, in particular of the monomers styrene, butadiene, isoprene, chloroprene, acrylnitrile and methyl methacrylate, as well as chlorosulfonated polyethylene.

Suitable copolymers are, for example, also commercially available from Kraton Polymers, USA. Suitable chlorosulfonated polyethlyenes are commercially available, for example, under the trade name Hypalon® from Dupont Performance Elastomers, LLC, USA, or under the trade name Toso-CSM® from Tosoh Corporation, Japan.

Particularly suitable copolymers are liquid rubbers of the type commercially available under the trade names Hypro® CTBN, ETBN or VTBN from Emerald Performance Materials, LLC, USA, and epoxy-resin modified liquid rubbers of the type Hypro® CTBN. Vinyl-terminated acrylonitrile/butadiene copolymers are particularly preferred.

Also particularly suitable are polyurethane(meth)acrylates, in particular a polyurethane(meth)acrylate PUMA, which can be obtained from the reaction of a polyol P with a diisocyanate and a hydroxy functionalized, amine functionalized or amide-functionalized ethylenically unsaturated monomer.

The hydroxy-functionalized, amine-functionalized or amide-functionalized ethylenically unsaturated monomer is preferably (meth)acrylamide, (meth)acrylic acid or (meth) acrylic acid ester.

The polyol P is preferably a polyester polyol, polyether polyol or a polycarboxylate polyol. Particularly suitable are polyols P with a molecular weight from 400 to 12,000 g/mole, in particular 1,000 to 6,000 g/mole, preferably 2,000 to 5,500 g/mole. The polyol P is particularly preferably a polyester polyol or a polyether polyol.

If the polyol P is a polyester polyol, it is preferably an aliphatic polyester polyol. It is even more preferably a polyester diol.

Suitable polyols P also include polyether polyester polyols, in particular copolymers of the above named polyester polyols and polyether polyols.

If the polyol P is a polyester polyol, it is preferably one of the amorphous polyester polyols, in particular those that are liquid at room temperature (23° C.). Also preferred are polyester polyols that have a low glass transition temperature ($T_g$), in particular a glass transition temperature in the range of −80° C. to 0° C., in particular from −70° C. to −50° C.

If the polyol P is a polyether polyol, it is preferably one of the polyoxyethylene polyols, polyoxypropylene polyols and polyoxybutylene polyols, in particular polyoxyethylene diols, polyoxypropylene diols, polyoxybutylene diols, polyoxyethylene triols and polyoxypropylene triols.

Suitable diisocyanates include basically all diisocyanates. Aliphatic and cycloaliphatic diisocyanates are preferred. Most preferred is 1-isocyanato-3,3,5-trimethyl-5-isocyanatomethyl-cyclohexane (IPDI).

A core-shell polymer consists of an elastic core polymer (core) and a rigid shell polymer (shell). Particularly suitable core-shell polymers consist of a rigid shell of a rigid thermoplastic polymer which is grafted onto a core of cross-linked elastic acrylate or butadiene polymers.

Particularly suitable core-shell polymers are those that swell but do not dissolve in methyl methacrylate MMA.

Additional particularly suitable core-shell polymers are acrylate-based core-shell polymers like those that are commercially available, for example, under the trade name Durastrength® from Arkema Inc., USA.

Preferred core-shell polymers are also MBS (methyl methacrylate/butadiene/styrene) polymers, for example, like those commercial available under the trade name Clearstrength® from Arkema Inc., USA, or Paraloid® from Rohm and Haas, USA.

The core-shell polymers are preferably used in a quantity of 2-10% by weight, particularly preferably 2-5% by weight, in relation to the total composition.

Most preferred is a composition b1) that contains an elastomer, in particular a polyurethane(meth)acrylate and/or a vinyl-terminated acrylonitrile/butadiene copolymer.

Particular preference can also be given to a composition b1) that has an elastomer, in particular a polyurethane (meth)acrylate and/or a vinyl-terminated acrylonitrile/butadiene copolymer, and b2) a core-shell polymer, in particular an acrylate-based core-shell polymer or an MBS polymer.

If the composition has b1) and b2), it can also be advantageous if the total quantity of b1) and b2) together equals 10-35% by weight, in particular 12-35% by weight, in relation to the total composition.

The composition also has c) at least one radical-former, in particular a peroxide, a hydroperoxide or a perester, most preferably dibenzoyl peroxide.

Typically, the composition also has at least one catalyst for the radical formation. This catalyst is in particular a tertiary amine, in particular an aromatic tertiary amine, a transition metal salt or a transition metal complex. For example, such suitable tertiary amines are aromatic amines, in particular selected from the group consisting of N,N-dimethylaniline, N,N-diethylaniline, N,N-Bis(hydroxyalkyl)aniline and N,N-bis(2-hydroxyethyl)aniline, N,N-alkyl hydroxyalkylaniline such as N-ethyl-N-hydroxyethylaniline, N,N-dimethyl-p-toluidine, N,N-diethyl-p-toluidine, N-methyl-N-hydroxyethyl-p-toluidine, N,N-bis(2-hydroxyethyl)-p-toluidine and alkoxylated N,N-bis(hydroxyethyl)-p-toluidine, N-ethoxylated p-toluidine, N,N-bis(2-hydroxyethyl)-xylidine, N-alkyl morpholine and mixtures thereof. Transition metal salts and transition metal complexes are, for example, sales and complexes of cobalt, nickel, copper, manganese or vanadium.

Additional preferred catalysts for radical formation are described, for example, in paragraphs [0041]-[0054] of US 2002/0007027 A1, the full disclosure of which is hereby incorporated by reference.

The catalyst for the radical formation is conventionally used in a quantity of 0.01 to 3% by weight, in particular from 0.1 to 2% by weight, in relation to the composition.

For example, molecules can also be used as radical formers that form radicals under the influence of heat or electromagnetic radiation, which then result in the polymerization of the composition. Typically, these are thermally activate-able radical-formers and photo-initiators.

Suitable thermally activate-able radical-formers are those that are still sufficiently stable at room temperature but form radicals even at slightly elevated temperatures, for example azo-bis-isobutyronitrile (AIBN).

Photo-initiators are radical-formers that form radicals under the influence of electromagnetic radiation. Particularly suitable is a photo-initiator which, when irradiated with an electromagnetic radiation at a wavelength from 230 nm to 400 nm, forms radicals and is liquid at room temperature. For example, photo-initiators of this type are selected from the group consisting of α-hydroxyketones, phenylglyoxylates, monoacylphosphines, diacylphosphines, phosphinoxides and mixtures thereof.

In addition to methyl methacrylate MMA, the composition can also have additional free radically polymerizable monomers M which can be selected in particular from the group consisting of tetrahydrofurfuryl(meth)acrylate, tetrahydrofuryl(meth)acrylate, cyclohexyl(meth)acrylate, isobornyl(meth)acrylate and trimethylcyclohexyl(meth)acrylate.

The percentage of these free radically polymerizable monomers M is preferably 0 to 10% by weight, in particular 0 to 5% by weight, in relation to the total composition.

It can be advantageous if the composition does not have any additional free radically polymerizable monomers M in addition to methyl methacrylate MMA.

The composition can also contain at least one filler. Particular suitable for this purpose are naturally occurring, ground or precipitated calcium carbonates (chalks), which are optionally coated with fatty acids, in particular stearates, montmorillonite, bentonite, barium sulfate ($BaSO_4$, also called barite or heavy spar), calcined kaolin, quartz powder, aluminum oxide, aluminum hydroxide, silicic acids, in particular pyrogenic silicic acids, modified castor oil derivatives and polymer powders or polymer fibers. Preference is given to the use of calcium carbonates, and the greatest preference is given to the use of coated calcium carbonates.

The filler is conventionally added in a percentage of 0.01 to 50% by weight, in particular from 10 to 30% by weight, preferably 15 to 20% by weight, in relation to the total composition.

The composition can also contain at least one epoxy resin which has on average more than one epoxy group per molecule. Preferably, the epoxy resin is a diglycidyl ether of bisphenol A, of bisphenol F and of bisphenol A/F. The term "A/F" refers to a mixture of acetone with formaldehyde, which is used as a feedstock in its production. Preferably, the epoxy resin is an epoxy liquid resin. The epoxy resin is also suitably a mixture of liquid epoxy resin with solid epoxy resin.

Suitable liquid epoxy resins are commercially available, for example, under the trade names Araldite® GY 250, Araldite® PY 304, Araldite® GY 282 from Huntsman International LLC, USA, or D.E.R.® 331 or D.E.R.® 330 from The Dow Chemical Company, USA, or under the trade names Epikote® 828 or Epikote® 862 from Hexion Specialty Chemicals Inc., USA.

The composition can optionally also contain additional components. Such additional components are in particular dyes, pigments, inhibitors, UV and heat-stabilizers, anti-static agents, anti-inflammatory agents, biocides, plasticizers, waxes, flow improvers, adhesives, thixotropy agents, separators and additional common raw materials and additives with which a person skilled in the art will be familiar.

Preferably, the composition is a two-component composition, wherein two components K1 and K2 are stored separately from each other prior to application. Typically, the first component K1 contains in particular those ingredients of the composition described above that have free radically polymerizable groups. The second component K2 contains in particular the radical formers. In a two-component composition, other ingredients, in particular those that by reacting among themselves have an adverse effect on the stability of the composition during storage, are kept separately.

Preferably, in the two-component compositions described above the component K1 has the a) methylmethacrylate MMA, b1) the at least one elastomer and/or b2) at least one core-shell polymer, and the at least one radical former, and optional additional ingredients such as catalysts for the free radical formation and fillers, and the component K2, the radical starter and optionally any fillers and epoxy resins. The volume ratio during the mixing of K1 with K2 lies in particular in the range from 1:1 to 10:1.

In certain cases it can be advantageous to color the two components K1 and K2 differently from each other. In doing so, during the mixing of the components, the quality of the mixing can be verified and improper mixing can be detected early. This measure also makes it possible to qualitatively verify whether the specified mixing ratio is achieved.

A two-component composition of this type is typically stored in packaging that has two chambers that are separated from each other. The component K1 is therefore stored in the one chamber and the component K2 in the other chamber of the packaging. Suitable packaging formats include, for example, dual cartridges such as twin or coaxial cartridges, or multi-chamber pouches or bags with adapters. Preferably the two components K1 and K2 are mixed by means of a static mixer which can be attached to the two-chamber package.

Suitable packages of this type are described, for example, in US 2006/0155045 A1, WO 2007/096355 A1 and in US 2003/0051610 A1, the full disclosure of which is hereby incorporated by reference.

In an industrial-scale plant, the two components K1 and K2 are typically stored separately from each other in drums or hobbocks and are expelled and mixed for application by means of geared pumps, for example. The composition can be applied to a substrate by hand or in an automated process by means of robots.

The composition according to the invention is cured by a radical polymerization reaction of the methyl methacrylate MMA and optionally other free radically polymerizable components in the composition. The progress of the reaction that results in the curing of the composition, in particular the speed of the reaction, can be set by the selection of the components used. Typically, the composition is cured by imparting a high initial strength to the composition in an early stage in spite of a long open time. The open time is typically 1-90 minutes.

The invention relates to the use of the composition as described above as a glue, sealant or coating for the bonding or sealing or coating of substrates containing plasticized PVC, wherein the percentage of plasticizer is 20% by weight to 40% by weight in relation to the total weight of the plasticized PVC.

The substrate preferably consists of more than 50% by weight of plasticized PVC, in relation to the total weight of the substrate. Preferably the substrate consists of more than 70% by weight, in particular more than 90% by weight of plasticized PVC in relation to the total weight of the substrate.

The substrate can also contain materials that are suitable as processing aids for PVC. Typically, such materials are selected from the group consisting of high-density polyethylene (HDPE), medium-density polyethylene (MDPE), low-density polyethylene (LDPE), polyethylene, polypropylene (PP), polyethylene terephthalate (PET), polystyrene (PS), ethylene vinyl acetate (EVA), chlorosulfonated polyethylene, thermoplastic polyolefins (TPO), ethylene propylene diene (EPDM) rubber and polyisobutylene (PIB), and mixtures thereof. The substrate advantageously consists of less than 5% by weight, preferably less than 1% by weight, and particularly preferably less than 0.5% by weight of the above mentioned materials suitable as processing aids for PVC in relation to the total weight of the substrate.

The substrate is preferably a waterproofing membrane, in particular for the waterproofing of foundations or subsoils.

It is further advantageous if the sealing membrane is a flexible waterproofing membrane, in particular a flexible sheet. This sheet can easily be rolled up and thus easily stored or transported. The waterproofing membrane can therefore be easily transported to the construction site, where it can be rolled out and cut to the required dimensions.

The waterproofing membrane is typically used in the form of a pre-fabricated sheet. In that case, the waterproofing membrane is preferably manufactured by an industrial process in a film-producing plant and arrives at the construction site preferably in the form of a waterproofing membrane that can be unrolled for use. However, the waterproofing membrane can also be used in the form of strips with a width of typically 1-20 cm, to seal the seams between two roofing sheets, for example. The waterproofing membrane can also be manufactured and used in the form of flat bodies for the repair of damaged spots in waterproofing sheets such as roofing sheets, for example.

One preferred use of the waterproofing membrane is therefore a use for the waterproofing of above-ground and underground structures and civil engineering works, in particular of roofs, floors, waterways and tunnels.

To be optimally suited for use as a waterproofing membrane, the membrane must be as waterproof as possible and must not decompose or be mechanically damaged under the long-term effects of exposure to water or moisture. Films of this type like the ones that are already in use in the prior art for waterproofing purposes for above-ground and underground construction and civil engineering works are particularly suitable for use as waterproofing membranes. The waterproofing membrane should advantageously have at least a low degree of elasticity so that it can span differences in thermal expansion between the waterproofing membrane and the foundation or subsoil caused by temperatures, for example, or cracks in the foundation or subsoil caused by stresses without damage to or tearing of the waterproofing membrane that would adversely affect the waterproofing function of the waterproofing membrane.

The substrates are preferably wet, damp or moist substrates and/or substrates that are frequently exposed to moisture. The substrates are preferably damp or moist during the bonding with the composition and/or are frequently, in particular more than 10% of the time, exposed to moisture in the form of standing/flowing water in the bonded state.

The use according to the invention occurs in particular in a process of bonding two substrates S1 and S2 comprising the steps i) Application of a composition as described above to a substrate S1;

ii) Bonding of the applied composition to a second substrate S2 within the open time;

or i') Application of a composition as described above to a substrate S1;

ii') Application of a composition as described above to a substrate S2;

iii') Joining of the two substrates S1 and S2 provided with the composition within the open time;

or i") Application of a composition as described above between two substrates S1 and S2;

The second substrate S2 thereby consists of the same material as the substrate S1 or a material that is different from the substrate S1. In the case of a two-component composition, the at least partial mixing of the two components takes place before step i) or i'), ii') and i").

Also possible is a method for the bonding of two substrates S1 and S2 comprising the steps i''') Application of a component K1 as described above to a substrate S1;

ii''') Application of a component K2 as described above to a substrate S2;

iii''') Joining of the two substrates S1 and S2 each provided with one component K1 and K2 respectively.

In a method of this type, the two components K1 and K2 are mixed while joining the substrates. This method is suitable in particular for bonding over very thin adhesive layers.

The composition according to the invention can also be used in a method for the sealing or coating of a substrate S1 comprising the steps i'''') Application of a composition as described above to a substrate S1;

ii'''') Curing of the composition.

In the case of a two-component composition, the at least partial mixing of the two components occurs before step i'''').

The substrate S1 is preferably a substrate that contains plasticized PVC, wherein the percentage of plasticizer is 20% by weight to 40% by weight, in particular 25% by weight to 35% by weight, in relation to the total weight of the plasticized PVC, as described above.

Preferably, the substrate S1 is a waterproofing membrane, in particular for the waterproofing of foundations or subsoils.

The substrate S2 is preferably:

a waterproofing membrane containing plasticized PVC, wherein the percentage of plasticizer is 20% by weight to 40% by weight, in particular 25% by weight to 35% by weight, in particular for the waterproofing of foundations or subsoils, or a three-dimensional object made of plastic, construction materials such as concrete or gypsum, or also substrates such as glass, wood and metals, in particular a three-dimensional object containing plasticized PVC, wherein the percentage of plasticizer is 20% by weight to 40% by weight, in particular 25% by weight to 35% by weight. Particularly suitable molded bodies are, for example, molded bodies for solar power systems, i.e. photovoltaic or solar heating systems, such as solar cells, mountings, cable ducts, cable trays etc.

The use of the composition for substrates S2 of this type is preferred in particular on account of the simplicity and speed of fastening by bonding, the low additional weight of the adhesive, the short curing time of the adhesive, even at low temperatures, and the excellent resistance to weathering of the cured adhesive.

In an additional aspect, this invention comprises a composition for the bonding, sealing or coating, in particular for the bonding, of plasticized PVC, wherein the percentage of plasticizer is 20% by weight to 40% by weight, in particular 25% by weight to 35% by weight, in relation to the total weight of the plasticized PVC, comprising:
- a') 55-65% by weight of methyl methacrylate MMA in relation to the total weight of the composition, and
- b1') 10-20% by weight, in relation to the total weight of the composition, of at least one elastomer, and/or
- b2') 2-10% by weight, preferably 2-5% by weight, in relation to the total weight of the composition, of at least one core-shell polymer, and
- c') at least one radical former, in particular a peroxide, a hydroperoxide or a perester, most preferably dibenzoyl peroxide, wherein the elastomer is a polyurethane(meth)acrylate and/or a vinyl-terminated acrylonitrile/butadiene copolymer, and the core-shell polymer is an acrylate-based core-shell polymer or an MBS polymer.

This invention further comprises a cured composition that can be obtained from a composition described above for bonding, sealing or coating by means of a curing process.

The invention also comprises items that have been bonded, sealed or coated with one of the compositions described above. These items are preferably a structure, in particular an above-ground or underground structure.

EXAMPLES

Exemplary embodiments of the invention are explained in greater detail below. It goes without saying that the invention is not restricted to the exemplary embodiments described below.

Production of a Polyurethane Methacrylate PUMA on the Basis of a Polyether 800 g of polyether diol (calculated $M_n$=8,000 g/mole; OH number 13.9 mg KOH/g; water content 0.018% by weight) and 45.8 g of 1-isocyanato-3,3,5-trimethyl-5-isocyanatomethyl-cyclohexane (IPDI; Desmodur® I, Bayer MaterialScience AG, Germany) were reacted in the presence of dibutyl tin dilaurate at 90° C. to obtain an isocyanate-group-terminated polyurethane polymer with a titrimetrically determined content of free isocyanate groups of 1% by weight. Subsequently, 29.6 g of hydroxyethyl methacrylate (HEMA), commercially available under the trade name Rocryl® 400 from Rohm and Haas, USA, were added, which reacted with the free isocyanate groups to form polyurethane methacrylate PUMA. The substance obtained is a colorless liquid with an NCO content of ≤0.03% by weight.

The polyurethane methacrylate PUMA" was produced, analogous to PUMA', with a polyether diol with an $M_n$ of 10,000-15,000 g/mole (Bayer MaterialScience AG) and a polyether diol with an $M_n$ of 1,000 g/mole (BASF), IPDI and HEMA.

Production of the Compositions

The following compositions were produced:

As component K1, the ingredients listed in Tables 1 and 2 were mixed with one another in the indicated percentages by weight in a dissolver at a maximum temperature of 80° C. and agitated until a macroscopically homogeneous paste was obtained.

SikaFast 5200B (Sika AG, Switzerland), containing dibenzoyl peroxide, was used as component K2.

The components K1 and K2 produced were filled into the separate chambers of dual cartridges and were mixed at the time of the application in a weight ratio of 10:1 by means of a static mixer.

Description of the Test Methods

The peel force (T-peel measurement) was determined by using test specimens made of PVC containing 35% by weight phthalate as plasticizer with a thickness of 1.5 mm, a width of 5 cm and a length of 14 cm.

For the measurement of the peel force on dry test specimens, the test specimens were wiped clean with isopropanol and dried for 10 minutes before the application of the adhesive composition.

For the measurement of the peel force on wet test specimens, the test specimens were stored in water for 12 hours and then the visible moisture was wiped off with a wet cloth before the application of the adhesive composition.

Then two test specimens were bonded with their upper ends along their entire width of 5 cm to an adhesive layer having a thickness of 1 mm.

Subsequently, the test specimens bonded as described above were placed between two flat surfaces, a weight of 10 kg/0.25 m² was applied and the test specimens were stored for 3 days at 23° C. and 50% relative humidity.

Subsequently, the test specimens were stored for an additional 4 days without weighting at 23° C. and 50% relative humidity.

Subsequently, the test pieces were subjected to a 180° T-peel test as described in DIN 53281 at 23° C. and 50% relative humidity, and a traction speed of 100 mm/min.

TABLE 1

Compositions 1-4 and reference examples
Ref 1-Ref 4 in per cent by weight as well as the adhesion results:

|  | 1 | Ref. 1 | Ref. 2 | Ref. 3 | Ref. 4 | 2 | 3 | 4 |
|---|---|---|---|---|---|---|---|---|
| K1 |  |  |  |  |  |  |  |  |
| Monomer |  |  |  |  |  |  |  |  |
| MMA | 60 |  |  |  |  | 60 | 60 | 60 |
| Tetrahydrofurfuryl methacrylate |  | 60 |  |  |  |  |  |  |
| Trimethylcyclohexyl methacrylate |  |  | 60 |  |  |  |  |  |
| Benzyl methacrylate |  |  |  | 60 |  |  |  |  |
| Isobornyl methacrylate |  |  |  |  | 60 |  |  |  |
| Elastomer |  |  |  |  |  |  |  |  |
| VTBN |  |  |  |  |  |  |  | 20 |
| PUMA' | 15 | 15 | 15 | 15 | 15 | 20 |  |  |
| PUMA" |  |  |  |  |  |  | 20 |  |
| Core-Shell[b] | 2 | 2 | 2 | 2 | 2 | 2 | 2 | 2 |

TABLE 1-continued

Compositions 1-4 and reference examples
Ref 1-Ref 4 in per cent by weight as well as the adhesion results:

|  | 1 | Ref. 1 | Ref. 2 | Ref. 3 | Ref. 4 | 2 | 3 | 4 |
|---|---|---|---|---|---|---|---|---|
| Precipitated chalk | 15 | 15 | 15 | 15 | 15 | 12 | 12 | 12 |
| Pyrog. silicic acid | 5 | 5 | 5 | 5 | 5 | 5 | 5 | 5 |
| Quartz powder | 2 | 2 | 2 | 2 | 2 |  |  |  |
| Catalyst[a] | 1 | 1 | 1 | 1 | 1 | 1 | 1 | 1 |
| Total | 100 | 100 | 100 | 100 | 100 | 100 | 100 | 100 |
| K2 |  |  |  |  |  |  |  |  |
| SikaFast-5200B | 15 | 15 | 15 | 15 | 15 | 15 | 15 | 15 |
| Adhesion [N/50 mm] dry | 350 | none | none | none | none | 280 | 225 | 300 |
| Adhesion [N/50 mm] wet | 300 | none | none | none | none | 315 | 250 | 285 |

[a]Catalyst for radical formation (tertiary amine based on toluidine);
[b]Core-shell polymer with a polybutyl acrylate core and a methacrylate shell
none = no adhesion

TABLE 2

Compositions 5-13 and Reference Example Ref 5
in per cent by weight as well as the adhesion results:

|  | 5 | 6 | 7 | 8 | Ref. 5 | 9 | 10 | 11 | 12 | 13 |
|---|---|---|---|---|---|---|---|---|---|---|
| K1 |  |  |  |  |  |  |  |  |  |  |
| Monomer |  |  |  |  |  |  |  |  |  |  |
| MMA | 30 | 50 | 60 | 70 | 60 | 60 | 60 | 60 | 60 | 60 |
| Elastomer |  |  |  |  |  |  |  |  |  |  |
| PUMA' | 15 | 15 | 15 | 15 |  | 5 | 10 | 20 | 25 | 30 |
| Core-Shell[b] | 5 | 5 | 5 | 5 |  |  |  |  |  |  |
| Precipitated chalk | 15 | 15 | 15 | 7 | 15 | 15 | 15 | 14 | 8 | 3 |
| Pyrog. silicic acid | 2 | 2 | 2 | 2 | 5 | 5 | 5 | 5 | 6 | 6 |
| Quartz powder | 32 | 12 | 2 |  | 19 | 14 | 9 |  |  |  |
| Catalyst[a] | 1 | 1 | 1 | 1 | 1 | 1 | 1 | 1 | 1 | 1 |
| Total | 100 | 100 | 100 | 100 | 100 | 100 | 100 | 100 | 100 | 100 |
| K2 |  |  |  |  |  |  |  |  |  |  |
| SikaFast-5200B | 15 | 15 | 15 | 15 | 15 | 15 | 15 | 15 | 15 | 15 |
| Adhesion [N/50 mm] dry | 50 | 80 | 350 | 400 | none | 50 | 275 | 180 | 115 | 90 |
| Adhesion [N/50 mm] wet | 50 | 90 | 300 | 350 | none | 30 | 90 | 140 | 85 | 90 |

[a]Catalyst for radical formation (tertiary amine based on toluidine);
[b]Core-shell polymer with a polybutyl acrylate core and a methacrylate shell
none = no adhesion

The invention claimed is:

1. An article comprising an adhesive, sealant, or coating composition and a first substrate, wherein:
   the composition comprises:
      20% to 90% by weight methyl methacrylate, in relation to the total weight of the composition;
      either 1% to 40% by weight of at least one elastomer, in relation to the total weight of the composition; 1% to 20% by weight, of at least one core-shell polymer, in relation to the total weight of the composition; or 1% to 40% by weight of at least one elastomer, in relation to the total weight of the composition and 1% to 20% by weight, of at least one core-shell polymer, in relation to the total weight of the composition; and
      at least one radical former; and
   the first substrate comprises a plasticized polyvinylchloride having from 20% to 40% by weight of a plasticizer, in relation to a total weight of the plasticized PVC.

2. The article of claim 1 comprising from 50% to 80% of the methylmethacrylate.

3. The article of claim 1 comprising from 55% to 70% of the methylmethacrylate.

4. The article of claim 1 comprising 1% to 40% by weight of the at least one elastomer, wherein the elastomer comprises free radically polymerizable groups.

5. The article of claim 1 comprising from 7.5% to 35% of the at least one elastomer.

6. The article of claim 1 comprising from 10% to 20% of the at least one elastomer.

7. The article of claim 1 comprising 1% to 40% by weight of the at least one elastomer, wherein elastomer is a polyurethane or block copolymer.

8. The article of claim 1 comprising 1% to 40% by weight of the at least one elastomer, wherein the elastomer is a polyurethane (meth)acrylate, a vinyl-terminated acrylonitrile/butadiene copolymer, or is a combination of a polyurethane (meth)acrylate, a vinyl-terminated acrylonitrile/butadiene copolymer.

9. The article of claim 1 comprising from 2% to 10% of the at least one core-shell polymer.

10. The article of claim 1 comprising from 2% to 5% of the at least one core-shell polymer.

11. The article of claim 1 comprising 1% to 20% by weight, of at least one core-shell polymer, wherein the core-shell polymer comprises a rigid shell of a rigid thermoplastic polymer which is grafted onto a core of crosslinked elastic acrylate or butadiene polymer.

12. The article of claim 1 comprising 1% to 40% by weight of the at least one elastomer, in relation to the total weight of the composition and 1% to 20% by weight, of the at least one core-shell polymer, in relation to the total weight of the composition.

13. The article of claim 12, wherein a total quantity of the at least one elastomer and the at least one core-shell polymer is from 10% to 35% by weight, in relation to the total composition.

14. The article of claim 12, wherein a total quantity of the at least one elastomer and the at least one core-shell polymer is from 12% to 35% by weight, in relation to the total composition.

15. The article of claim 1, wherein the radical former is a peroxide, a hydroperoxide or a perester.

16. The article of claim 1, wherein the radical former is dibenzoyl peroxide.

17. The article of claim 1, wherein the first substrate comprises 25% to 35%, by weight, plasticizer.

18. The article of claim 1, wherein the elastomer comprises the polymerization product of styrene, butadiene, isoprene, chloroprene, acrylonitrile, methyl methacrylate, chlorosulfonated polyethylene, or a combination of any two or more thereof.

19. The article of claim 1 further comprising a radical forming catalyst comprising a tertiary amine, a transition metal salt, or a transition metal complex.

20. The article of claim 1, wherein the substrate comprises more than 50% by weight of plasticized PVC, in relation to the total weight of the substrate.

21. The article of claim 20, wherein the substrate comprises more than 70% by weight of plasticized PVC, in relation to the total weight of the substrate.

22. The article of claim 21, wherein the substrate comprises more than 90% by weight of plasticized PVC, in relation to the total weight of the substrate.

23. The article of claim 1, wherein the composition and substrate are configured to be frequently exposed to moisture.

24. The article of claim 1 which is a waterproofing membrane.

25. The article of claim 24, wherein the waterproofing membrane is an above-ground building construction membrane, an underground building construction membrane, or a civil engineering membrane.

26. A composition comprising:
55% to 65% by weight of methyl methacrylate, in relation to the total weight of the composition;
either 10% to 20% by weight of at least one elastomer, in relation to the total weight of the composition; 2% to 10% by weight, of at least one core-shell polymer in relation to the total weight of the composition; or 10% to 20% by weight of at least one elastomer, in relation to the total weight of the composition and 2% to 10% by weight, of at least one core-shell polymer in relation to the total weight of the composition; and
at least one radical former;
wherein:
the elastomer is a polyurethane (meth)acrylate, a vinyl-terminated acrylonitrile/butadiene copolymer, or a combination thereof; and
the core-shell polymer is an acrylate-based core-shell polymer, or a methylmethacrylate-butadiene-styrene polymer.

27. A method for bonding a first substrate and a second substrate, the method comprising:
applying the composition of claim 26 to a first substrate; and
bonding with the composition the first substrate to a second substrate within an open time of the composition;
allowing the composition to cure;
the first substrate comprises a plasticized PVC, wherein the percentage of plasticizer 20 is 20% by weight-40% by weight, in particular 25% by weight-35% by weight, in relation to the total weight of the plasticized PVC.

28. A method for bonding a first substrate and a second substrate, the method comprising:
applying the composition of claim 26 to a first substrate;
applying the composition to a second substrate; and
joining the first substrate and the second substrate such that the composition on the first substrate contacts the composition on the second substrate during an open time of the composition; and
allowing the composition to cure.

* * * * *